United States Patent [19]

McCabe et al.

[11] Patent Number: 5,216,821
[45] Date of Patent: Jun. 8, 1993

[54] SYSTEM AND METHOD FOR REMOVING A VOLATILE COMPONENT FROM A MATRIX

[75] Inventors: Mark M. McCabe, Lowell; Benjamin S. Dowd, Arlington, both of Mass.

[73] Assignee: Remediation Technologies, Incorporated, Concord, Mass.

[21] Appl. No.: 683,299

[22] Filed: Apr. 10, 1991

[51] Int. Cl.$^5$ ............................................. F26B 7/00
[52] U.S. Cl. ........................................ 34/17; 34/66; 34/180; 34/181
[58] Field of Search .................. 34/179, 180, 181, 182, 34/183, 13, 66, 17

[56] References Cited

U.S. PATENT DOCUMENTS

| 940,945 | 11/1909 | Shepard et al. | |
|---|---|---|---|
| 2,096,176 | 10/1937 | Harrington | 34/12 |
| 2,116,573 | 5/1938 | Harrington | 110/15 |
| 3,027,854 | 4/1962 | Akerlund | 110/15 |
| 3,518,774 | 7/1970 | Reimer | 34/33 |
| 3,605,273 | 9/1971 | Andersen | 34/179 |
| 3,707,129 | 12/1972 | Kawashimo et al. | 110/15 |
| 4,089,277 | 5/1978 | Paul | 110/204 |
| 4,156,392 | 5/1979 | Bayeh | 110/110 |
| 4,504,222 | 3/1985 | Christian | 34/182 |
| 4,726,301 | 2/1988 | Des Ormeaux et al. | 110/250 |
| 4,738,206 | 4/1988 | Noland | 110/346 |
| 4,985,131 | 1/1991 | Lane | 208/13 |
| 5,005,495 | 4/1991 | Feitel | 110/344 |
| 5,074,057 | 12/1991 | Kanai | 34/179 |

FOREIGN PATENT DOCUMENTS

| 3744287A1 | 7/1989 | Fed. Rep. of Germany . |
| 3809115A1 | 9/1989 | Fed. Rep. of Germany . |
| WO83/01910 | 6/1983 | PCT Int'l Appl. . |
| 323523 | 12/1929 | United Kingdom . |

OTHER PUBLICATIONS

International Search Report for PCT/US92/02753, mailed Oct. 7, 1992.

Primary Examiner—Henry A. Bennet
Attorney, Agent, or Firm—Hamilton, Brook, Smith & Reynolds

[57] ABSTRACT

A system and method is disclosed for removing a volatile component from volatile component-containing matrix. A volatile component-containing matrix, such as a sludge contaminated with volatile organic material or volatile inorganic material, is directed into a housing. The matrix is then directed through the housing by a screw conveyor. A heat transfer medium is conducted through a conduit within the screw conveyor to heat the screw conveyor to a temperature sufficient to volatilize at least a portion of the volatile component. The heat transfer medium can be a molten eutectic salt solution. The volatilized component is transported by a hot gas discharged over the matrix along at least a substantial portion of the length the housing from a gas inlet tube which is disposed above the matrix within the housing and is substantially parallel to the screw conveyor. The hot gas transports the volatilized component into a gas outlet tube which is also disposed above the matrix within the housing and is substantially parallel to the gas inlet tube. The volatilized component is then directed through the gas outlet tube and out of the housing, thereby removing the volatile component from the matrix. The matrix is then discharged from the housing.

26 Claims, 6 Drawing Sheets

SYSTEM AND METHOD FOR REMOVING A VOLATILE COMPONENT FROM A MATRIX

BACKGROUND OF THE INVENTION

Many wastes, such as sludges and contaminated soils, include a matrix and one or more volatile components. For example, sludges generated by industrial processes which include a solid matrix component also often include a volatile component which is not suitable for disposal by direct discharge to the environment. In another example, soil can become contaminated by oil, gasoline or other contaminants, such as by leakage from storage vessels or during drilling of oil wells.

One attempt to dispose of such wastes is by containment in sealed land fills. However, seals in land fills can deteriorate and fail, thereby allowing the wastes to leak into the surrounding ground. Further, land-fills generally require large areas of land and availability of suitable land-fill sites is diminishing. In addition, governmental regulation limits the kinds of waste which can be disposed of in land fills. Disposal of wastes has also been attempted by incineration However, airborne pollutants are typically released into the atmosphere as incinerator exhaust.

Another attempt to dispose of volatile component-containing wastes includes volatilization of the volatile components. The volatilized components can then be treated separately. Removal of volatile components from matrices, however, has often been substantially incomplete because of the relatively low volatility of many volatile components.

Thus, a need exists for a system and method for removing volatile components from matrices which overcome or minimize the above-mentioned problems.

SUMMARY OF THE INVENTION

The present invention relates to a new system and method for removing at least a portion of a volatile component from a matrix.

The system includes a housing having a housing inlet and a housing outlet. At least one screw conveyor is disposed within the housing for conveying the matrix from the housing inlet through the housing to the housing outlet, the screw conveyor defining a screw conveyor conduit for conducting a hot medium through the screw conveyor conduit to heat the screw conveyor to a temperature sufficient to volatilize at least a portion of the volatile component within the matrix. A gas inlet tube is disposed within the housing substantially parallel to the screw conveyor, whereby a hot gas can be discharged from the gas inlet tube above the matrix along at least a substantial portion of the length of the housing. A gas outlet tube is disposed within the housing substantially parallel to the gas inlet tube for receiving the hot gas and the volatilized component, whereby the hot gas discharged from the gas inlet tube passes over the matrix and transports the volatilized component into the gas outlet tube, thereby removing at least a portion of the volatile component from the matrix.

The method includes conveying a volatile component-containing matrix through a housing from a housing inlet to a housing outlet by rotating a screw conveyor disposed in the housing. A hot medium is directed through a screw conveyor conduit defined by the screw conveyor to heat the screw conveyor to a temperature sufficient to cause the screw conveyor to volatilize at least a portion of the volatile component within the matrix. A hot gas is discharged above the matrix along at least a substantial portion of the length of the housing from a gas inlet tube which is disposed within the housing and is substantially parallel to the screw conveyor, whereby the hot gas passes over the matrix and transports the volatilized component to a gas outlet tube which is disposed within the housing and is substantially parallel to the gas inlet tube. The hot gas and the volatilized component are directed into the gas outlet tube, whereby the volatilized component is discharged from the housing, thereby removing at least a portion of the volatile component from the matrix.

This invention has many advantages. In general, wastes which include a matrix and a volatile component can be heated by a screw conveyor to temperatures sufficient to volatilize at least a significant portion of the volatile component. Hot gas is discharged from a gas inlet tube along at least a substantial portion of the length of a housing in which the screw conveyor is disposed. The hot gas passes over the matrix and thereby transports the volatilized component to a gas outlet tube. The volatilized component can be transported by the hot gas into the gas outlet tube at a point along the gas outlet tube proximate to the point of introduction of the hot gas into the housing. Also, the temperature of the screw conveyor can be significantly raised by a heated eutectic salt solution to increase the rate of volatilization of the volatile component. Significantly increasing the temperature of the screw conveyor also increases the number of volatile components having relatively low volatilities which can be removed from wastes.

DETAILED DESCRIPTION OF THE INVENTION

The features and other details of the apparatus and method of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the invention.

Figure 1:
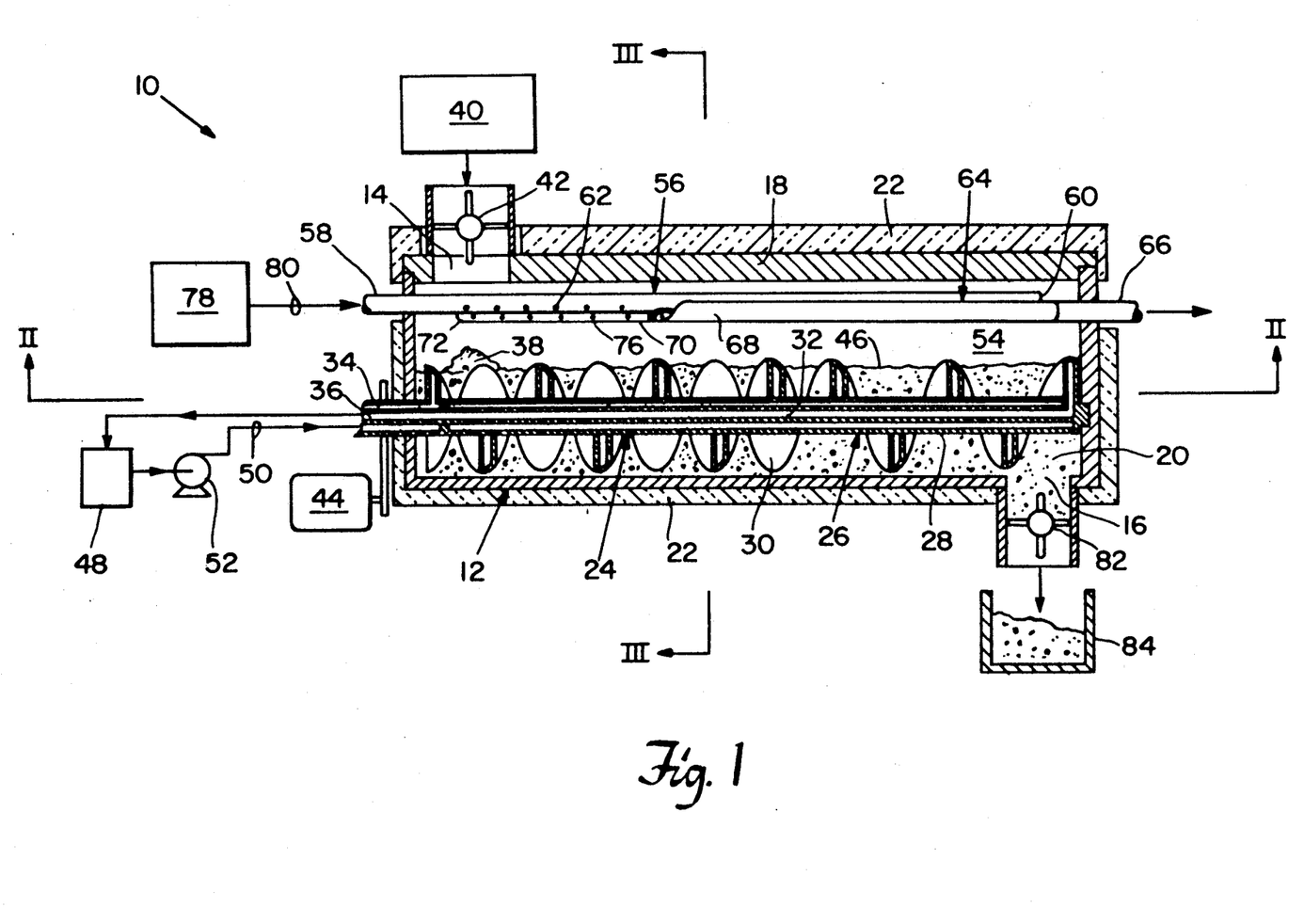
FIG. 1 is a section view of one embodiment of a thermal removal system of the invention.

In one embodiment of the invention, shown in FIG. 1, thermal removal system 10 includes housing 12 having a housing inlet 14 and a housing outlet 16. Lid 18 is disposed on housing 12. Housing chamber 20 is defined by housing 12 and lid 18. Housing 12 and lid 18 can be insulated by insulation layer 22 to prevent significant heat loss from thermal removal system 10 through housing 12 or lid 18.

Screw conveyors 24,26 are disposed within housing chamber 20. Each screw conveyor includes a shaft 28 and flights 30 disposed about shaft 28. Screw conveyors 24,26 are identical except that screw conveyor 24 is a right-hand screw conveyor and screw conveyor 26 is a left-hand screw conveyor. Screw conveyors 24,26 each define a conduit 32 extending through shaft 28 and flights 30. Each conduit 32 has an annular conduit inlet 34 and a conduit outlet 36.

Housing 12 and screw conveyors 24,26 are disposed at a slight incline from housing inlet 14 to housing outlet 16 to substantially prevent discharge of matrix which includes an appreciable amount of a volatile component from thermal removal system 10. Preferably, the angle to the horizontal of the incline is in the range of between about 1° and about 15°.

Housing 12 and screw conveyors 24,26 can be of a suitable screw processor, such as is known in the art. One example of a suitable screw processor is a "Holo-Flite" type screw processor, disclosed in U.S. Pat. No. 2,731,241 and in U.S. Pat. No. 2,753,159. In a particularly preferred embodiment, the screw processor is a D7-10-6 model Holo-Flite screw processor, commercially available from Denver Equipment Company. It is to be understood, however, that additional screw conveyors can be employed. For example, four screw conveyors can be disposed in a housing chamber.

Volatile component-containing matrix 38 is directed from source 40 by feeding means 42 through housing inlet 14 into housing chamber 20. Examples of volatile component containing matrices include sludges, volatile contaminant-containing soils, etc. Examples of suitable sludges for removal of volatile components from a matrix within the sludge by thermal removal system 10 include oil refinery sludges, wood-treatment sludges, papermill sludges, etc. Examples of volatile contaminants of which a significant portion can be removed from a matrix by thermal removal system 10 include volatile inorganic compounds, such as cyanides, and volatile organic compounds, such as oils, gasoline, creosotes, transformer fluids, etc.

Matrix 38 has a volatile component content which is suitable for removing a significant amount of the volatile component from matrix 38 by volatilization of the component in thermal removal system 10. Preferably, the amount of volatile component in matrix 38 before volatilization in housing chamber 20 is less than about fifty percent by weight. It is to be understood, however, that matrix 38 can include more than one volatile component.

An example of a suitable feeding means 40 is an air lock, or "double dump," whereby volatile component-containing matrix 38 can be directed into housing chamber 20 while maintaining a significant pressure difference between housing chamber 20 and the atmosphere. Typically, the pressure difference is about 0.5 inches of water. An example of a suitable air lock is a 18°-24° C. model air lock, commercially available from Prater Industries.

Preferably, the pressure in housing chamber 20 is sufficiently less than atmospheric to prevent significant leakage of a volatilized component or hot gas to the atmosphere. In a particularly preferred embodiment, the pressure in housing chamber 20 is in the range of between about 0.1 and about one inch of water less than atmospheric pressure.

Matrix 38 is directed through housing inlet 14 into housing chamber 20 at a rate sufficient to allow at least a significant portion of the volatile component in matrix 38 to be volatilized by heat transferred to matrix 38 from screw conveyors 24,26. In one embodiment, matrix 38 is directed into housing chamber 20 at a rate in the range of between about five hundred and about eight thousand pounds per hour.

Screw conveyors 24,26 are in parallel arrangement and are rotated by screw rotating means 44 in opposite directions, whereby matrix 38 at housing inlet 14 is conveyed by rotation of screw conveyors 24,26 from housing inlet 14 to housing outlet 16. Conveyance of matrix 38 through housing chamber 20 causes matrix 38 to form matrix bed 46 within housing chamber 20. In one embodiment, matrix bed 46 has a depth in housing chamber 20 sufficient to submerge a substantial portion of screw conveyors 24,26. Preferably, the tops of flights 30 are elevated about one-half inch above the top of matrix bed 46. Matrix 38 is conveyed through housing chamber 20 at a rate sufficient to allow at least a significant portion of the volatile component to volatilize by transfer of heat from screw conveyors 24,26 to matrix 38. Preferably, screw conveyors 24,26 are rotated at a rate in the range of between about 0.5 and about ten revolutions per minute. In a particularly preferred embodiment, screw conveyors 24,26 are rotated at a rate sufficient to cause matrix 38 to have a residence time in housing chamber 20 in the range of between about twenty minutes and about sixty minutes.

A suitable medium is heated at hot medium source 48 to a temperature sufficient to heat screw conveyors 24,26 to a temperature sufficient to cause screw conveyors 24,26 to volatilize at least a significant portion of the volatile component in matrix 38. In one embodiment, the medium is heated to a temperature in the range of between about 100° C. and about 600° C. The medium can be heated by a suitable heating means, not shown, such as is known in the art.

A suitable hot medium is a medium which can be heated, without significant degradation, to a temperature which is sufficient to heat screw conveyors 24,26 to a temperature sufficient to cause at least a significant portion of the volatile component within matrix 38 to volatilize. Preferably, the hot medium is a liquid. Examples of suitable hot media include steam, oil, a suitable eutectic salt solution, etc. An example of a suitable eutectic salt solution is a eutectic salt solution including potassium nitrate, sodium nitrate and sodium nitrite. In a particularly preferred embodiment, the eutectic solution is a solution of "Hi-Tech Salt" eutectic salt, commercially available from Coastal Chemical Company.

The hot medium is directed from hot medium source 48 through conduit 50 to conduit inlet 34 by a suitable means, such as by operation of pump 52. The hot medium is then directed from conduit inlet 34 through conduit 32 to conduit outlet 36. The rate at which the hot medium is directed through conduit 32 is sufficient to cause turbulent flow of the hot medium and to heat screw conveyors 24,26 to a temperature sufficient to volatilize at least a significant portion of the volatile component within matrix 38. At least a significant portion of the volatile component in matrix 38 is thereby volatilized and enters head space 54, which is defined by housing 12, lid 18 and matrix bed 46.

Gas inlet tube 56 is disposed in head space 54 and has a gas inlet end 58 and a sealed end 60. Sealed end 60 is distal to gas inlet end 58. Apertures 62 are defined by gas inlet tube 56 and are disposed at regular intervals along the length of gas inlet tube 56. Gas inlet tube 56 and apertures 62 each have a diameter sufficient to allow a hot gas to be directed through gas inlet tube 56 at a rate sufficient to remove at least a significant portion of the volatilized component from head space 54 at the operating conditions of thermal removal system 10. Preferably, gas inlet tube 56 has a diameter in the range of between about 0.75 and about four inches, and apertures 62 have a diameter in the range of between about 0.125 and about two inches. In a particularly preferred embodiment, wherein housing 12, lid 18 and screw conveyors 24,26 are a D7-10-6 model Holo-Flite screw processor, gas inlet tube 56 has a diameter of about one and 0.75 inches and apertures 62 have a diameter of about 3/32 inches. Alternatively, gas inlet tube 56 can define a single slot, not shown, extending along a substantial portion of the length of gas inlet tube 56 rather then define a plurality of apertures 62.

Gas outlet tube 64 is disposed within head space 54 and is substantially parallel to gas inlet tube 56. Gas outlet end 66 of gas outlet tube 64 is disposed at housing 12. Gas outlet tube 64 is configured as a wye and has arms 68,70. Arms 68,70 are sealed at ends 72 which are distal to gas outlet end 66. It is to be understood, however, that gas outlet tube 64 can have other configurations, such as a single tube, not shown, which is substantially parallel to gas inlet tube 56, or a tee configuration, also not shown, wherein arms extend from the tee parallel to gas inlet tube 56. Apertures 76 are defined by gas outlet tube 64 at regular intervals along the length of gas outlet tube 64. Gas outlet tube 64 and apertures 76 each have a diameter sufficient to allow hot gas directed into housing chamber 20 to be removed from housing chamber 20 at a rate sufficient to remove at least a significant portion of the volatilized component from head space 54 under the operating conditions of thermal removal system 10. Preferably, gas outlet tube 64 has a diameter in the range of between about 0.75 and about eight inches, and apertures 76 have a diameter in the range of about 0.1 and about four inches. In the embodiment wherein housing 12, lid 18 and screw conveyors 24,26 are a D7-10-6 model Holo-Flite screw conveyor, arms 68,70 of gas outlet tube 64 each have a diameter of one and one-quarter inches and apertures 76 have a diameter of 3/32 inches.

Fluid communication is provided between hot gas source 78 and gas inlet end 58 by hot gas conduit 80 for directing a suitable hot gas from hot gas source 78 through hot gas conduit 80 into gas inlet tube 56. Suitable gases are gases which are sufficiently stable to transport the volatilized component within head space 54 without significant reaction with the volatilized component. Examples of suitable gases include steam, carbon dioxide, nitrogen, etc. Preferably, the hot gas is a substantially inert gas, such as nitrogen.

The temperature of the hot gas is sufficient to prevent significant condensation of the volatilized component. Preferably, the temperature of the hot gas is in the range of between about 315° C. and about 540° C. The rate at which the hot gas is directed into gas inlet tube 56 is sufficient to cause the hot gas to pass across matrix bed 46 at a rate sufficient to cause at least partial fluidization of an upper portion of matrix bed 46 and to remove at least a significant portion of the volatilized component from head space 54. In a particularly preferred embodiment, the hot gas is nitrogen which is directed into gas inlet tube 56 at a rate of about thirty cubic feet per minute, a pressure of between about thirty and about eighty psig. and a temperature of about 540° C.

The hot gas is directed by a suitable delivery means from hot gas source 78 through hot gas conduit 80 and into gas inlet tube 56 through gas inlet end 58. An example of a suitable delivery means is application of pressure to hot gas at hot gas source 78 by a suitable pressurizing means, not shown, such as is known in the art. The hot gas is then directed through apertures 62 of gas inlet tube 56 into head space 54 along at least a substantial portion of the length of housing 12. Hot gas directed into head space 54 then passes across the top of matrix bed 46 to gas outlet tube 64. The volatilized component in head space 54 is transported by the hot gas to gas outlet tube 64 and through apertures 76 into gas outlet tube 64. The hot gas can be directed through apertures 76 into gas outlet tube 64 by reducing the pressure within gas outlet tube 64 to less than the pressure within head space 54. The pressure within gas outlet tube 64 is reduced by a suitable means, such as is known in the art. An example of such a suitable means is by providing fluid communication between gas outlet end 66 and a suitable vacuum pump, not shown.

The hot gas and volatilized component are then directed through gas outlet tube 64 and out of thermal removal system 10 through gas outlet end 66. At least a significant portion of the volatile component in matrix 38 directed into housing chamber 20 is thereby removed from matrix 38. Matrix 38, from which at least a significant portion of the volatile component has been removed, is then directed through housing outlet 16 by gravitational force and into air lock 82 and is discharged from thermal removal system 10 into a suitable matrix receiving means, such as bin 84.

Housing 12, lid 18 and screw conveyors 24,26 are formed of materials which are suitable for contact with volatile component-containing matrices at temperatures of up to about 540° C. Examples of suitable materials of construction of housing 12, lid 18 and screw conveyors 24,26 include 304-type stainless steel, 316-type stainless steel, incoloy, hastelloy, etc. Preferably, screw conveyors 24,26 are formed of stainless steel having a nickel content which is at least that of 304-type stainless steel.

Figure 2:
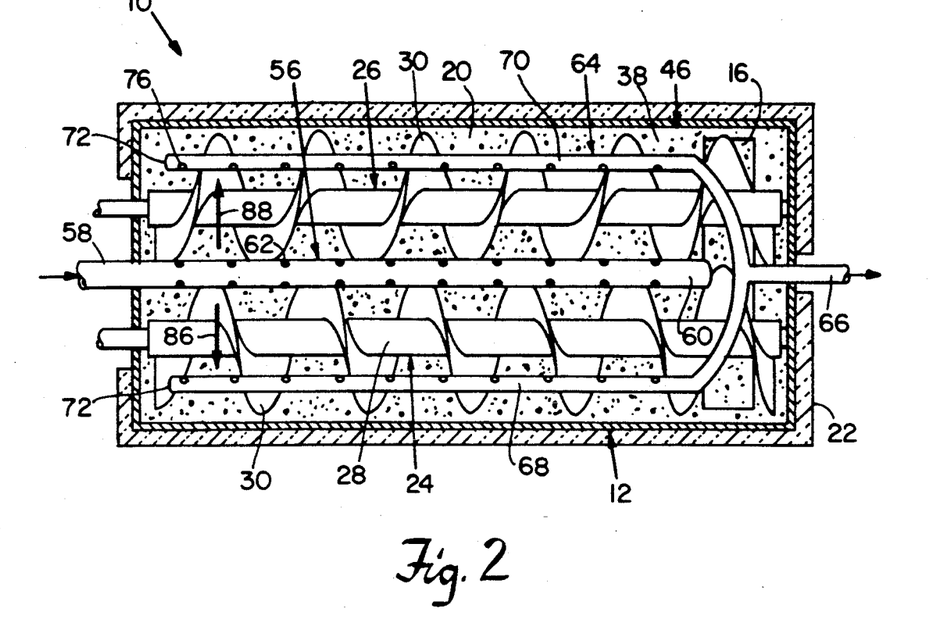
FIG. 2 is a plan view taken along line II—II of the thermal removal system illustrated in FIG. 1.

As can be seen in FIG. 2, gas inlet tube 56 of thermal removal system 10 extends along a substantial portion of the length of housing chamber 20 and is disposed centrally to the width of housing chamber 20 above screw conveyors 24,26. Gas outlet tube 64 is configured as a wye. Arms 68,70 of gas outlet tube 64 are disposed within housing chamber 20 on opposite sides of gas inlet tube 56. Arms 68,70 are substantially parallel to gas inlet tube 56 and are spaced from gas inlet tube 56 so that hot gas directed through apertures 62 of gas inlet tube 56 pass across matrix bed 46 before the hot gas is received through apertures 76 and into gas outlet tube 64.

Hot gas directed into gas inlet tube 56 is discharged into housing chamber 20 through apertures 62 so that hot gas is discharged into housing chamber 20 along a substantial portion of the length of housing 12 Hot gas discharged through apertures 62 passes over matrix bed 46 toward apertures 76 at arms 68,70 in a direction which is substantially perpendicular to the path of matrix 38 from housing inlet 14 to housing outlet 16. The flow of hot gas from apertures 62 to apertures 76 at arms 68,70 are shown as arrows 86,88.

Screw conveyor 24 has a right-hand orientation and screw conveyor 26 has a left-hand orientation, whereby rotation of screw conveyors 24,26 in opposite directions causes matrix 38 in matrix bed 46 to be conveyed in a single direction through housing chamber 20 to housing outlet 16. Flights 30 of screw conveyor 24 are in non-interfering relation with flights 30 of screw conveyor 26.

Figure 3:
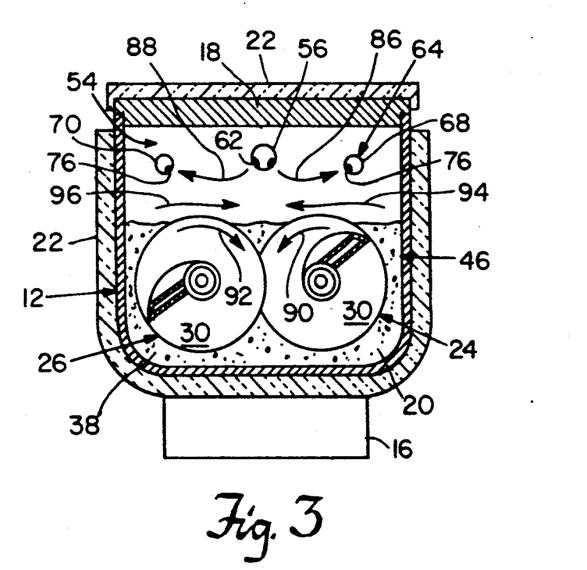
FIG. 3 is a section view taken along line III—III of the thermal removal system illustrated in FIG. 1.

FIG. 3 is a section view of thermal removal system 10 taken along line III—III of FIG. 1. Flights 30 of screw conveyor 24 slightly overlap flights of screw conveyor 26. Arrows 90,92 indicate the direction of rotation of screw conveyors 24,26, respectively. Rotation of screw conveyors 24,26 in the directions indicated by arrows 90,92 can cause matrix 38 in matrix bed 46 to move at the top of matrix bed 46 toward the center of housing chamber 20 as indicated by arrows 94,96. A volatile component which has been volatilized by heat conducted from screw conveyors 24,26 to matrix bed 46 enters head space 54. The volatilized component is thereby directed into head space 54.

Hot gas is directed through gas inlet tube 56 and is discharged into head space 54 above matrix bed 46 from gas inlet tube 56 through apertures 62 The hot gas is directed across the top of matrix bed 46 to gas outlet tube 64 at arms 68,70. Volatilized component in head space 54 is entrained by the flow of hot gas across the top of matrix bed 46. At least a significant portion of the volatilized component is thereby transported by the hot gas across matrix bed 46 to arms 68,70, as indicated by arrows 86.88. The hot gas directed across the top of matrix bed 46 is directed to apertures 76 most proximate to apertures 62 from which the hot gas was discharged The volatilized component is thereby transported by the hot gas to apertures 76 which are the most proximate to the location along the length of housing chamber 20 where the volatilized component was released from matrix bed 46 into head space 54. The hot gas and transported volatilized component are then directed through apertures 72 and into gas outlet tube 64. The hot gas and volatilized component in gas outlet tube 64 are subsequently conducted out of thermal removal system 10 through gas outlet tube 64.

As screw conveyors 24,26 continue to rotate, volatile component-containing matrix 38 which has been introduced into housing chamber 20 is directed to housing outlet 16. The volatilized component enters head space 54 and is transported out of head space 54 into gas outlet tube 64 by the hot gas. The partial pressure of volatilized component in head space 54 is thereby maintained at a level which is sufficiently low to allow continued volatilization of the volatile component from matrix 38 as matrix 38 is directed along matrix bed 46 to housing outlet 16.

Figures 4, 4A:
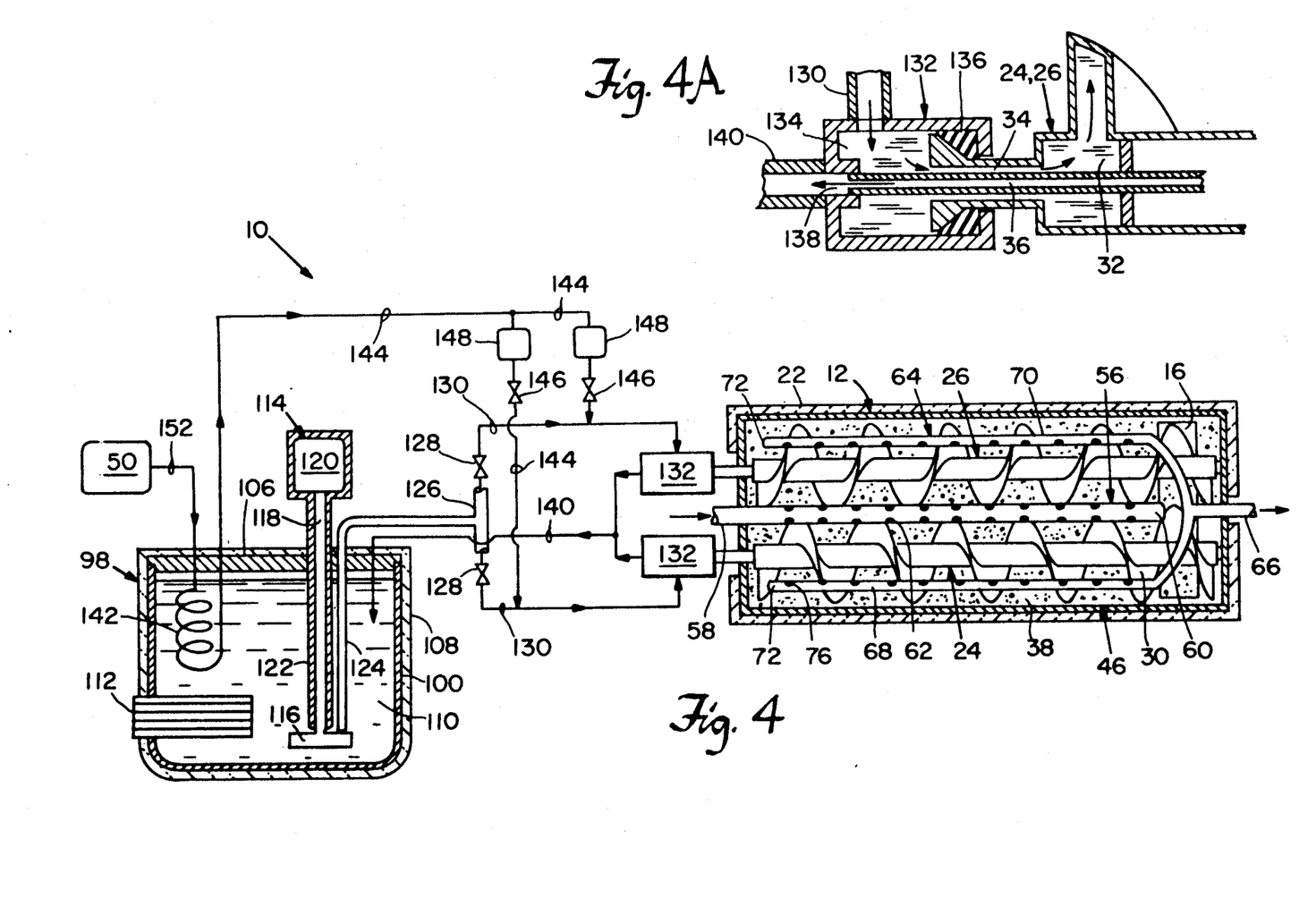
FIG. 4 is a schematic representation of the thermal removal system of the invention further including a eutectic salt solution heating system.
FIG. 4A is an enlarged view of a rotary joint of the thermal removal system shown in FIG. 4.

As shown in FIG. 4, screw conveyors 24,26 of thermal removal system 10 can be heated by eutectic heating system 98. Eutectic heating system 98 includes vessel 100. Lid 106 is disposed over vessel 100. Insulation 108 is disposed at vessel 100 and lid 106 to prevent significant heat loss from eutectic heating system 98 through vessel 100 or lid 106. Bath 110 is disposed within vessel 100 and includes a suitable eutectic salt solution. An example of a suitable eutectic salt solution for use with eutectic heating system 98 is formed by heating a mixture of potassium nitrate, sodium nitrate and sodium nitrite, commercially available as "HITEC Salt" eutectic composition, from Coastal Chemical Company.

A suitable heating means 112 is disposed within vessel 100 for heating the eutectic composition disposed within vessel 100 to above the melting point of the eutectic composition. Also, heating means 112 maintains the eutectic salt solution at a temperature sufficient to heat screw conveyors 24,26 to a temperature sufficient volatilize at least a significant portion of the volatile component in matrix 38 of matrix bed 46. Examples of suitable heating means 112 include an electrical heating element, a coil through which superheated steam is directed, etc. Preferably, bath 110 is heated to a temperature in the range of between about 200° C. and about 600° C. In a particularly preferred embodiment, bath 110 is heated to a temperature of about 540° C.

Vertical submersible pump 114 extends through lid 106 into vessel 100. Impeller 116 of vertical submersible pump 114 is submerged in bath 110 and is connected by shaft 118 to pump motor 120, which is disposed above lid 106. Shaft 118 and pump motor 120 are enclosed by jacket 122 for circulation of a suitable cooling medium along shaft 118 and over pump motor 120 to prevent damage of shaft 118 and pump motor 120 by conduction of heat from bath 110. An example of a suitable vertical submersible pump 114 is a 15028 EB&XEM model vertical submersible pump, commercially available from Gusher Pump Company Examples of suitable cooling media for circulation through jacket 122 include mixtures of glycol and water, air, etc. It is to be understood, however, that pumps can be used which do not require cooling jackets, such as a vertical cantilever type pump, such as is known in the art.

Conduit 124 extends from impeller 116 to wye fitting 126 and valves 128 at wye fitting 126. Conduits 130 extend from valves 128 to rotary joints 132. Conduits 130, as well as all other conduits in eutectic heating system 98, other than conduits extending through rotary joints 132 and through screw conveyors 24,26, can be insulated to prevent significant heat loss from eutectic heating system 98 through the conduits.

Rotary joints 132 are fitted to screw conveyors 24,26. Rotary joints 132 are identical to each other As can be seen in FIG. 4A, rotary joints 132 define inlet conduits 134, which provide fluid communication between conduits 130 and annular conduit inlets 34 at screw conveyors 24,26. Seal rings 136 at inlet conduits 136 are disposed within rotary joints 132. Seal rings 136 are formed of a suitable material for sealing inlet conduit 134 during exposure of seal rings 136 to a suitable eutectic salt solution at a temperature of up to about 540° C. Rotary joints 132 also include outlet conduits 138 which provide fluid communication between conduit outlets 36 of screw conveyors 24,26 and conduits 140. Rotary joints 132 maintain fluid communication between conduits 130 and conduit inlets 34 and also between conduit outlets 36 and conduits 140 during rotation of screw conveyors 24,26.

Referring back to FIG. 4, preheat coil 142 is disposed within vessel 100. Preheat conduits 144 extend from preheat coil 142 and between preheat coil 142 and conduits 130. Valves 146 are disposed at preheat conduits 144. Suitable preheaters 148 are disposed at preheat conduits 144 between preheat coil 142 and valves 146. Preheaters 148 which are suitable include preheaters which can preheat a suitable heating medium flowing through preheat conduits 144 to a temperature sufficient to preheat screw conveyors 24,26 to a temperature which will prevent significant solidification of the eutectic salt solution in the conduits within screw conveyors 24,26. An example of a suitable preheater is an electrical resistance type preheater.

While valves 128 are in a closed position and valves 146 are in an opened position, a suitable preheating medium is directed by suitable means from medium source 150 through conduit 152 to preheat coil 142. A suitable preheat medium is a medium which is substantially thermally stable at a temperature at which screw conveyors 24,26 are sufficiently preheated to prevent significant solidification of the eutectic solution. The preheat medium can be, for example, a preheat gas. Examples of suitable preheat gases include nitrogen gas, steam, etc. Preferably, the preheat gas is nitrogen gas. Alternatively, the preheat medium can be hot gas discharged from housing 12 during removal of volatile components from matrix bed 46.

The preheat medium is directed from medium source 150 through conduit 152 by a suitable means, such as by pressurizing the preheat medium at medium source 150 with a suitable pump, not shown, or by discharging the preheat medium from a cylinder of pressurized preheat medium. For example, nitrogen gas is directed from medium source 150 through conduit 152 to preheat coil 142 at a rate sufficient to heat rotary joints 132 and screw conveyors 24,26 to a temperature sufficient to prevent significant solidification of the eutectic salt solution within rotary joints 132 or screw conveyors 24,26. Preferably, nitrogen gas is directed through preheat coil 142 at a rate sufficient to cause nitrogen to be directed through rotary joints 142 and screw conveyors 24,26 at a pressure of about sixty psig and at a rate of about thirty cubic feet per minute at a feet per minute at a temperature in the range of between about 315° C. and about 540° C.

In one embodiment, nitrogen gas is heated in preheat coil 142 by the eutectic salt solution in bath 110 to a temperature of about 200° C. The nitrogen gas is then directed through preheat conduits 144 and is further heated in preheat conduits 144 by preheaters 148 to a temperature in the range of between about 315° C. and about 540° C. The nitrogen is then directed to conduits 130. The heated nitrogen is then directed through conduits 130 and through rotary joints 132 into conduits 32 of screw conveyors 24,26. Rotary joints 132 and screw conveyors 24,26 are thereby heated to a temperature sufficient to allow the eutectic salt solution to be directed through rotary joints 132 and screw conveyors 24,26 without significant solidification of the eutectic salt solution within rotary joints 132 or screw conveyors 24,26. Preferably, rotary joints 132 and screw conveyors 24,26 are heated to a temperature of about 260° C. Nitrogen gas returning from screw conveyors 24,26 through rotary joints 132 is directed through conduits 140 and from conduits 140 into bath 110 at vessel 100.

When rotary joints 132 and screw conveyors 24,26 have been heated to a temperature sufficient to prevent significant solidification of eutectic salt solution in rotary joints 132 or within screw conveyors 24,26, valves 146 are closed and valves 128 are opened. Vertical submersible pump 114 is then activated to direct eutectic salt solution from bath 110 through impeller 116, conduit 124 and wye fitting 126. Eutectic salt solution is thereby directed through valves 128 and conduits 130 to rotary joints 132. The eutectic salt solution is directed through inlet conduits 134 of rotary joints 132 and through conduits 32 of screw conveyors 24,26 to thereby heat rotary joints 132 and screw conveyors 24,26 to a temperature sufficient to cause screw conveyors 24,26 to heat matrix 38 in thermal removal system 10 in an amount sufficient to volatilize at least a significant portion of the volatile component in matrix 38. Preferably, screw conveyors 24,26 are heated by the eutectic salt solution to a temperature in the range of between about 230° C. and about 600° C. In a particularly preferred embodiment, screw conveyors are heated to a temperature of about 540° C. The eutectic salt solution is directed through screw conveyors 24,26 at a rate sufficient to volatilize at least a significant portion of the volatile component of matrix 38 in thermal removal system 10. The eutectic salt solution is directed through screw conveyors 24,26 at a rate sufficient to cause turbulent flow of the salt solution within screw conveyors 24,26. Preferably, the rate of flow of the eutectic salt solution is in the range of between about sixteen and about one hundred and forty gallons per minute.

The eutectic salt solution is then conducted out of screw conveyors 24,26 and through outlet conduits 138 of rotary joints 132 to conduits 140 and is returned through conduits 140 to bath 110. Heat is continuously supplied to bath 110 by heating means 112 to thereby maintain bath 110 at a temperature sufficient to transfer sufficient heat to screw conveyors 24,26 to volatilize at least a significant portion of the volatile component of matrix 38 in thermal removal system 10. Eutectic salt solution which is returned to bath 110 through conduits 140 is reheated to the temperature maintained within bath 110 by heating means 112 for subsequent recirculation through rotary joints 132 and screw conveyors 24,26 for continuously heating matrix 38 in thermal removal system 10.

Following removal of the volatile component from matrix 38 in thermal removal system 10, the eutectic salt solution can be displaced from rotary joints 132 and from screw conveyors 24,26 by medium from medium source 150. The eutectic salt solution is displaced by closing valves 128 and by opening valves 146. Nitrogen is then directed from medium source 150 through conduit 152 and preheat coil 142 to heat the nitrogen to a temperature sufficient to prevent significant solidification of the eutectic salt solution. The heated nitrogen is directed from preheat coil 142 through preheat conduits 144, conduits 130 and through inlet conduits 134 of rotary joints 132. The nitrogen is then directed through conduits 32 of screw conveyors 24,26, through outlet conduits 138 of rotary joints 132 and then through conduits 140 to bath 110. The eutectic salt solution in rotary joints 132 and screw conveyors 24,26 is thereby displaced by the nitrogen and is returned to bath 110 without significant solidification of the eutectic salt solution. Rotary joints 132 and screw conveyors 24,26 can then be cooled without blockage of conduits within rotary joints 132 or screw conveyors 24,26 by solidification of the eutectic salt solution.

Recirculation of the eutectic salt solution through rotary joints 132 and screw conveyors 24,26 can be reestablished by preheating rotary joints 132 and screw conveyors 24,26 as discussed above. Valves 146 can then be closed and the flow of eutectic salt solution through rotary joints 132 and screw conveyors 24,26 can be reestablished by opening valves 128. The thermal removal system 10 can thereby be operated continuously or discontinuously without blockage of conduits within rotary joints 132 or screw conveyors 24,26 by solidification of the eutectic salt solution within the conduits.

Figure 5:
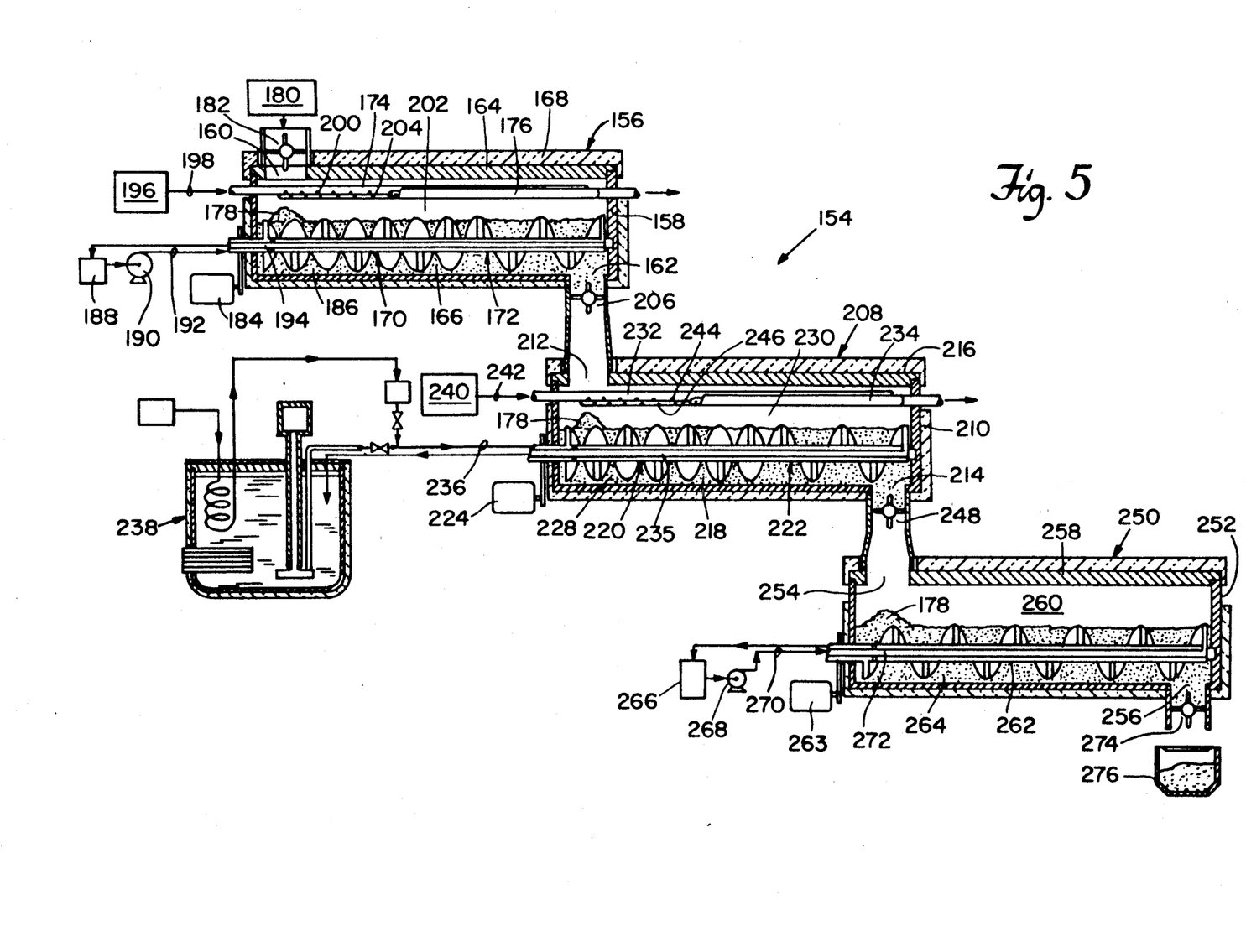
FIG. 5 is an schematic representation of another embodiment of the thermal removal system of the invention.

In another illustration of the invention, shown in FIG. 5, thermal removal system 154 includes a dryer 156. Dryer 156 includes a dryer housing 158 having a housing inlet 160 and a housing outlet 162. Lid 164 is disposed at dryer housing 158. Dryer housing 158 and lid 164 define housing chamber 166 and are insulated by insulation 168. Screw conveyors 170,172 are disposed in housing chamber 166. In a preferred embodiment, dryer housing 158, lid 164 and screw conveyors 170,172 are of a D-24-24 model Holo-Flite screw processor. Gas inlet tube 174 and gas outlet tube 176 are disposed above screw conveyors 170,172 and are substantially parallel to screw conveyors 170,172.

A suitable volatile component-containing matrix 178 is directed from matrix source 180 into air lock 182, which is disposed at housing inlet 160. Preferably, the water content in matrix 178 directed into dryer 156 is in the range of between about 10% and about 50% by weight.

Air lock 182 allows transfer of matrix 178 into thermal removal system 154 from matrix source 180 while maintaining a slight vacuum within thermal removal system 154. In a preferred embodiment, the vacuum in thermal removal system 154 is in the range of between about 0.1 and about one inch of water.

Screw conveyors 170,172 are rotated by rotating means 184 to cause matrix 178 to form a matrix bed 186 in housing chamber 166. The rate of rotation of screw conveyors 170,172 is sufficient to cause the matrix to have a residence time in thermal dryer 156 which allows at least a significant portion of the water in matrix 178 to be volatilized under the operating conditions of thermal dryer 156. Preferably, screw conveyors 170.172 are rotated at a rate sufficient to cause matrix 178 to have a residence time in the range of between about ten and about sixty minutes. In a particularly preferred embodiment, screw conveyors 170,172 are rotated at a rate in the range of between about 0.5 and about ten revolutions per minute.

Screw conveyors 170,172 are heated to a temperature in the range of between about 93° C. and 104° C. by directing a suitable heat transfer medium from medium source 188 through conduit 192 and then into screw conveyor conduits 194, defined by screw conveyors 170,172. Examples of suitable heat transfer media include, for example, steam, oil, etc. The rate of flow of heat transfer medium through screw conveyors 170,172 is sufficient to volatilize at least a significant portion of the water in matrix 178 directed into dryer 156. Matrix bed 186 is heated by screw conveyors 170,172 to a temperature sufficient to volatilize at least a significant portion of the water in the matrix 178, whereby water vapor is released from matrix bed 186.

A suitable gas is heated at hot gas source 196 to a temperature sufficient to prevent significant condensation of water vapor within dryer 156. Examples of suitable gases include inert gases, such as nitrogen, etc. Preferably, the gas is heated to a temperature of between about 104° C. and about 121° C. The heated gas is directed by a suitable means through conduit 198 and into gas inlet tube 174. The heated gas is then discharged from gas inlet tube 174 through apertures 200, spaced regularly along gas inlet tube 174, and into head space 202, defined by housing 158, lid 164 and the top of matrix bed 186.

Hot gas discharged into head space 202 from gas inlet tube 174 passes across the top of matrix bed 186. The hot gas transports water vapor from head space through apertures 204, which are spaced along gas outlet tube 176. The hot gas and water vapor are thereby directed into gas outlet tube 176 and are then directed through gas outlet tube 176 and out of dryer 156.

The hot gas and transported water vapor discharged from dryer 156 can be treated by known methods to remove particulates entrained with the hot gas and to remove a substantial portion of the water vapor and other chemicals volatilized with the water from matrix bed 186. The hot gas can then be recycled for reheating and delivery to dryer 156 or can be released to the atmosphere.

Matrix 178, from which a substantial portion of the water content has been volatilized and removed, is directed through housing outlet 162 and into air lock 206, which is disposed between dryer 156 and thermal processor 208. At least one volatile component can remain in matrix 178 which is discharged from dryer 156. The volatile component can be a component of matrix 178 which has a significantly lower vapor pressure than water.

Thermal processor 208 includes housing 210 having a housing inlet 212 and housing outlet 214. Lid 216 is disposed on housing 210. Housing chamber 218 is defined by housing 210 and lid 216. Screw conveyors 220,222 are disposed in housing chamber 218. In a preferred embodiment, housing 210, lid 216 and screw conveyors 220,222 are of a D-16-20 model Holo-Flite screw processor.

Matrix 178 is directed by air lock 206 from housing outlet 162 of dryer 156 through housing inlet 212 into thermal processor 208. Screw conveyors 220.222 are rotated by rotating means 224. Matrix 178 in thermal processor 208 is conveyed by rotation of screw conveyors 220,222 through housing chamber 218 to form matrix bed 228. Head space 230 is defined by housing 210, lid 216 and the top of matrix bed 228. Gas inlet tube 232 and gas outlet tube 234 are disposed within head space 230 and are substantially parallel to screw conveyors 220,222.

Screw conveyors 220,222 are heated to a temperature sufficient to volatilize at least a significant portion of the volatile component in matrix 178 as matrix 178 is conveyed through housing chamber 218. Preferably, screw conveyors 220,222 are heated by directing a eutectic salt solution through conduits 235, defined by screw conveyors 220,222. In a particularly preferred embodiment, screw conveyors 220,222 are heated by recirculating a eutectic salt solution through conduits 235 and conduits 236 from eutectic salt solution heating system 238, such as is described above and illustrated in FIG. 4. Screw conveyors 220,222 thereby heat matrix bed 228 to a temperature sufficient to volatilize at least a significant portion of the volatile component in matrix bed 228. Preferably, matrix bed 228 is heated to a temperature in the range of between about 260° C. and about 540° C.

A suitable inert gas is heated at gas source 240. Examples of suitable inert gases include nitrogen, etc. The inert gas is heated to a temperature sufficient to prevent significant condensation of volatilized component, within thermal processor 208. In a preferred embodiment, the inert gas is heated to a temperature in the range of between about 315° C. and about 540° C.

The hot inert gas is directed from gas source 240 through conduit 242 to gas inlet tube 232. The hot inert gas is then discharged from gas inlet tube 232 through apertures 244, which are defined by gas inlet tube 232 and extend at regularly spaced intervals along a substantial portion of the length of gas inlet tube 232. The hot inert gas then passes across head space 230 to gas outlet tube 234. The volatilized component in head space 230 is transported by the hot gas to gas outlet tube 234 in a direction which is substantially perpendicular to the direction of matrix 178 from housing inlet 212 to housing outlet 214. The transported volatilized component and the hot inert gas are directed into gas outlet tube 234 through apertures 246, which are defined by gas outlet tube 234 and extend at regularly spaced intervals along a substantial portion of the length of gas outlet tube 234. The hot gas and transported volatilized component are then directed through gas outlet tube 234 for discharge from thermal processor 208. At least a significant portion of the volatile component remaining in matrix 178 is thereby removed from matrix 178.

The hot gas and volatilized component discharged from thermal processor 208 through gas outlet tube 234 can then be treated by methods, such as by methods known in the art, to contain particulates entrained from matrix bed 228 and to separate the volatile component from the hot inert gas. The inert gas can then be recirculated for reheating and for redelivery to a gas inlet tube 232, or can be released to the atmosphere after suitable treatment, such as is known in the art, to remove contaminants.

Matrix 178 from which a substantial portion of the volatile components have been removed is conveyed by screw conveyors 220,222 to housing outlet 214 and into air lock 248, which is disposed at housing outlet 214. Matrix 178 is directed by air lock 248 to matrix cooler 250.

Matrix cooler 250 includes housing 252 having housing inlet 254 and housing outlet 256. Lid 258 is disposed on housing 252. Housing 252 and lid 258 define housing chamber 260. Screw conveyor 262 is disposed in housing 252. Matrix 178 is directed by air lock 248 through housing inlet 254 into housing chamber 260. Preferably, matrix cooler 250 is a 5-16-16 model Holo-Flite screw processor.

Screw conveyor 262 by rotating means 263 to convey matrix 178 from housing inlet 254 to housing outlet 256, whereby matrix 178 forms matrix bed 264. Matrix 178 directed into matrix cooler 250 preferably has a temperature greater than about 315° C.

Water is directed from water source 266 by pump 268 through water conduit 270 into a conduit 272, which is defined by screw conveyor 262. Screw conveyor 262 is thereby maintained at a temperature which is sufficiently cool to cause matrix 178 in matrix bed 264 to be cooled to a temperature suitable for handling matrix 178. Preferably, matrix 178 is cooled to a temperature in the range of between about 60° C. and about 82° C.

In a particularly preferred embodiment cooling water, having a temperature in the range of between about 10° C. and about 50° C. is directed through the conduit 272 in screw conveyor 262 at a rate of between about eight and about one hundred thirty gallons per minute. Preferably, screw conveyor 262 is rotated at a rate of between about one and about five revolutions per minute to thereby cause matrix 178 to have a residence period in matrix cooler 250 of between about ten and about thirty minutes. Cooling water is then discharged from screw conveyor 262 for return to water source 266. Water returned to water source 266 is subsequently cooled at water source 266 for return to screw conveyor 262. Alternatively, a closed-loop chiller, such as is known in the art, can be used to cool and recirculate water through screw conveyor 262.

Water formed by condensing water vapor discharged from dryer 156 can be directed into matrix 178 in matrix cooler 250 for diminishing generation of dust by matrix 178. Matrix 178, which has been cooled by screw conveyor 262, is conveyed by screw conveyor 262 to housing outlet 256. Matrix 178 is then discharged through housing outlet 256 into air lock 274 and is then discharged by a air lock 274 into a suitable matrix receiver 276, such as a bin, for subsequent processing or discharge of matrix 178 to the environment.

Figure 6:
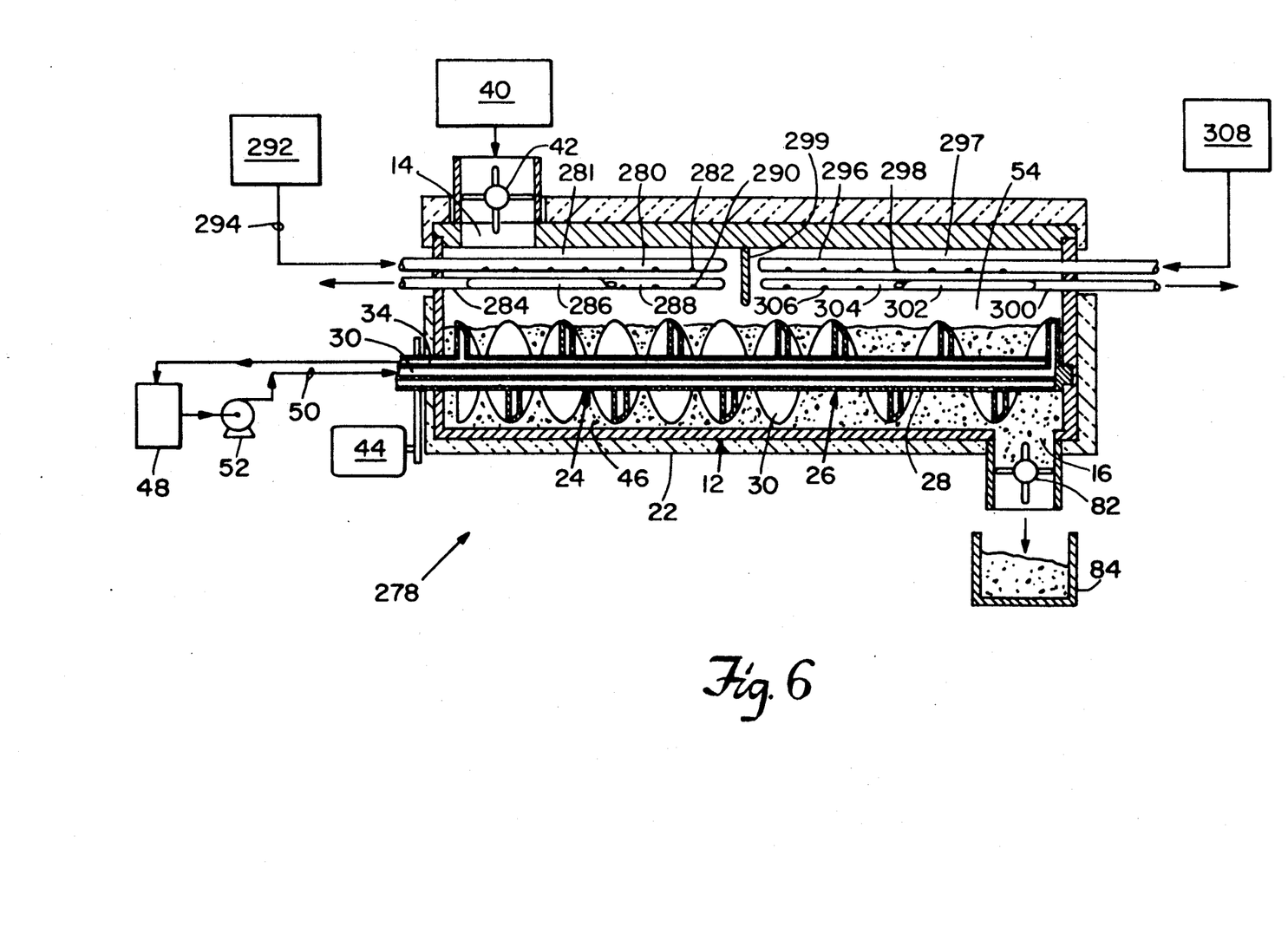
FIG. 6 is a section view of still another embodiment of the invention.

In another illustration of the invention, shown in FIG. 6, thermal removal system 278 is identical to thermal removal system 10, but does not include gas inlet tube 56, gas outlet tube 64 or hot gas source 78. Instead, first gas inlet tube 280 is disposed in head space 54 at first end 281 of thermal removal system 278 proximate to housing inlet 14. Apertures 282 are defined by first gas inlet tube 280 and are disposed at regular intervals along the length of first gas inlet tube 28.

First gas outlet tube 284 is disposed within head space 54 at first end 281 and beneath first gas inlet tube 280. First gas outlet tube 284 is configured as a wye and has arms 286,288, which extend substantially parallel to first gas inlet tube 280. Apertures 290 are defined by first gas outlet tube 284 and are disposed at regular intervals along the length of arms 286,288.

A first hot gas is directed from first hot gas source 292 through conduit 294 to first gas inlet tube 280 by a suitable method, such as by pressurizing the first hot gas at first hot gas source 292. Examples of suitable hot gases include air, nitrogen, etc. The temperature of the hot gas is sufficient to prevent condensation of a significant portion of volatilized gases proximate to first gas inlet tube 280. The first hot gas is directed through first gas inlet 280 and apertures 282 into head space 54. Volatilized components entering head space 54 from matrix bed 46 are transported by the first hot gas through apertures 290 into first gas outlet tube 284 by reducing the pressure within first gas outlet tube 284 to less than the pressure within head space 54 by a suitable means, such as a vacuum pump, not shown. The hot gas and volatilized component are thereby directed through first gas outlet tube 284 and out of thermal removal system 278.

Second gas inlet tube 296 is disposed within head space 54 at second end 297 of thermal removal system 278 and opposite first gas inlet tube 280. Apertures 298 are defined by second gas inlet tube 296 and are disposed at regular intervals along the length of second gas inlet tube 296. Partition 299 is disposed in headspace 54 between first gas inlet tube 294 and second gas inlet tube 296. Partition 299 baffles flow of gas between first end 281 and second end 297.

Second gas outlet tube 300 is disposed within head space 54 at second end 297 and beneath second gas inlet tube 296. Second gas inlet tube 300 is configured as a wye and has arms 302,304 which extend substantially parallel to second gas inlet tube 296. Apertures 306 are defined by second gas inlet tube 300 and are disposed at regular intervals along the length of arms 302,304.

A second hot gas is directed from second hot gas source 308 through conduit 310 to second gas inlet tube 296. The second hot gas is then directed through apertures 298 into head space 54. The second hot gas has the same composition as the first hot gas at first hot gas source 292. Alternatively, the second hot gas can have a different composition than the first hot gas The temperature of the second hot gas is sufficient to prevent condensation of a significant portion of volatilized components in head space 54 which are proximate to second gas inlet tube 296. In one embodiment, the temperature of the second hot gas is significantly higher than that of the first hot gas.

The second hot gas is directed across matrix bed 46 to arms 302,304 of second gas outlet tube 300. Volatilized components which enter head space 54 from matrix bed 46 proximate to second gas inlet tube 296 are transported by the second hot gas from head space 54 through apertures 306 into second gas outlet tube 300. The second hot gas and volatilized components are directed into second gas outlet tube 300 by reducing the pressure within second gas outlet tube 300 to a pressure which is significantly less than the pressure within head space 54. An example of a suitable means of reducing the pressure is by employing a vacuum pump, not shown. The second hot gas and the volatilized components are then directed through second gas outlet tube 300 and out of housing 12.

Figure 7:
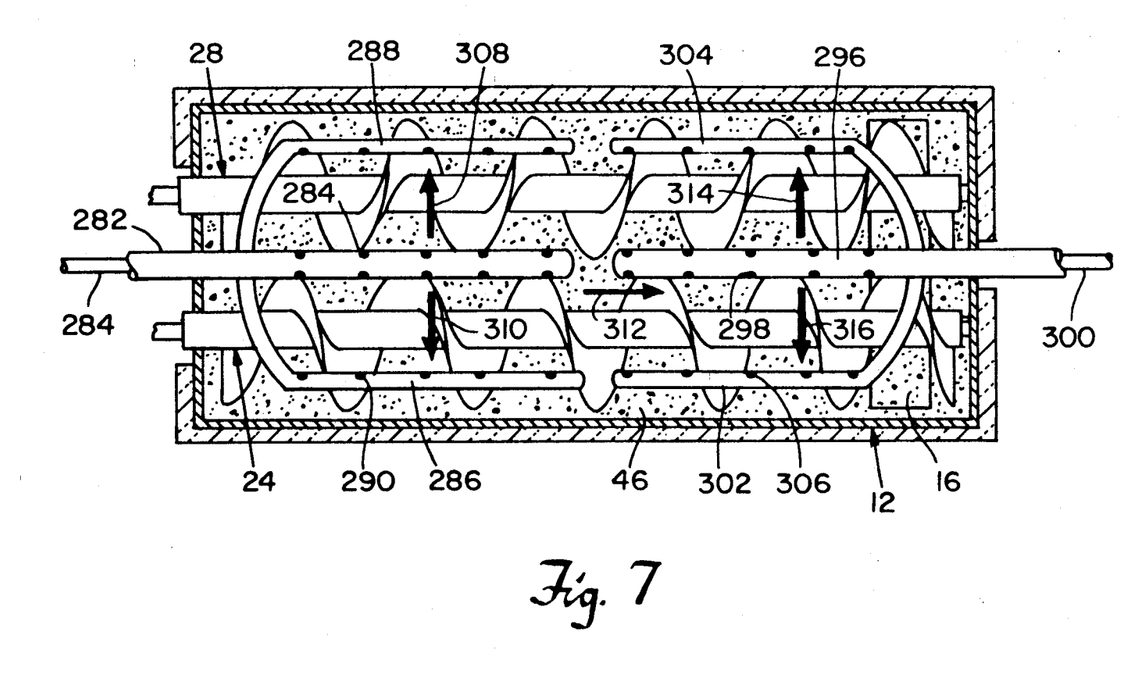
FIG. 7 is a plan view taken along line VII—VII of the embodiment illustrated in FIG. 6.

As can be seen in FIG. 7, the first hot gas is directed through apertures 284 from first gas inlet tube 282 and across matrix bed 46 in a direction indicated by arrows 308,310. The direction of the first hot gas across matrix bed 46 is substantially perpendicular to the direction of flow of matrix in matrix bed 46 to housing outlet 16, indicated by arrow 312. A substantial portion of the first hot gas is directed through apertures 290 into arms 286,288 of first gas outlet tube 284 for removal from housing 12 through first gas outlet tube 284. A substantial portion of volatile components within matrix bed 46 which are volatilized and enter the head space proximate to first gas inlet tube 282 are transported by the first hot gas and thereby removed from the thermal removal system through first gas outlet tube 284.

The second hot gas is directed through apertures 298 from second gas inlet tube 296 and across matrix bed 46 in a direction indicated by arrows 314,316. The direction of flow of the second hot gas is substantially perpendicular to the direction of flow of matrix in matrix bed 46 to housing outlet 16. A substantial portion of the second hot gas is directed through apertures 306 into arms 302,304 of second gas outlet tube 300. A substantial portion of volatile components with matrix bed 46 which are volatilized and enter the head space proximate to second gas inlet tube 296 are transported through second gas outlet tube 300 by the second hot gas and thereby removed from the thermal removal system.

In a matrix including a first volatile component, and a second volatile component, wherein the second volatile component has a volatility which is significantly less than the first volatile component, a substantial portion of the first volatile component volatilizes and enters the head space before a substantial portion of the second volatile component volatilizes and enters the head space. Therefore, the first hot gas will transport a significantly greater amount of the first volatilized component out of the thermal removal system than of the second volatilized component and the second hot gas will transport a significantly greater amount of the second volatilized component out of the thermal removal system than of the first volatilized component. The first and second hot gases leaving the thermal removal system can thereby be treated separately by a suitable condensing means, not shown, to condense the transported volatile components and form separate condensates. The condensate formed from the first hot gas has a greater portion of the first volatile component and the condensate formed from the second hot gas has a higher portion of the second, less volatile component.

Following removal of a substantial portion of volatile components from matrix conducted through thermal removal system 278, the matrix is directed through housing outlet 16. Preferably, the matrix is then directed into a suitable matrix cooler, not shown. An example of a suitable matrix cooler is a 5-16-16 model Holo-Flite screw processor, commercially available from Denver Equipment Company.

The invention will now be further and specifically described by the following examples. All parts and percentages are by weight unless otherwise stated.

EXAMPLE I

A sample of a petroleum waste-water treatment sludge, obtained from a petroleum refining facility, was treated in a thermal removal system of the invention which included a screw processor, a gas inlet tube, and a gas outlet tube. The screw processor was a D-7-10 model screw processor, commercially available from Denver Equipment Company. Molten eutectic salt was directed through a conduit in each of two screw conveyors of the screw processor. The eutectic salt was heated to a temperature of about 466° C. and directed through the conduits at a rate sufficient to cause the screw conveyors to heat the sludge samples directed into the screw processor to a temperature of about 393° C. The screw conveyors were rotated at a rate of about one revolution per minute to thereby cause the sludge to have a residence time in the screw processor of about eighty minutes. To effect drying of the sludge, an additional thirty minute residence time was simulated by cycling sludge discharged from the screw processor back to an inlet of the screw processor for additional heat treatment.

The gas inlet tube had a diameter of one and one-half inches. The gas outlet tube had a diameter of one and one-quarter inches and had a wye configuration. Apertures having a diameter of 3/32 inches were disposed at intervals of six inches along the length of both the gas inlet tube and the gas outlet tube. The gas directed through the gas inlet tube was nitrogen and had a temperature of 566° C. and a flow rate of twenty seven standard cubic feet per minute.

The amount of identified contaminants in parts per million (hereinafter "ppm"), both before and after treatment, are presented below in Table I:

TABLE I

| Petroleum Waste-Water Treatment Sludge | | | |
|---|---|---|---|
| Parameter | Waste Feed | Treated Sample | BDAT Standard |
| Oil & grease (ppm) | 143000 | <50 | — |
| Moisture (% by weight) | 47 | <1 | — |
| Volatile Organics (ppm) | | | |
| Benzene | 10 | <0.5 | 14 |
| Ethylbenzene | 9 | <0.5 | 14 |
| Toluene | 37 | <0.5 | 14 |
| Xylene, Total | 106 | <1 | 22 |
| Semi-Volatile Organics (ppm) | | | |
| Anthracene | <5 | <0.33 | 28 |

TABLE I-continued

Petroleum Waste-Water Treatment Sludge

| Parameter | Waste Feed | Treated Sample | BDAT Standard |
|---|---|---|---|
| Benzo(a)anthracene | 9 | <0.33 | 20 |
| Benzo(a)pyrene | 8 | <0.33 | 12 |
| Bis(2-ethylhexyl)phthalate | <5 | <0.33 | 7 |
| Chrysene | 21 | <0.33 | 15 |
| Di(n)butyl phthalate | <5 | <0.33 | 4 |
| Naphthalene | 178 | <0.33 | 42 |
| Phenanthrene | 173 | <0.33 | 34 |
| Pyrene | 24 | <0.33 | 36 |
| o-Cresol | <10 | <1.6 | 6 |
| p-Cresol | <10 | <1.6 | 6 |
| Phenol | <10 | <0.66 | 4 |
| Cyanide (ppm) | 15 | 1 | 2 |
| TCLP Extract (mg/l) | | | |
| Chromium | Not Tested | 0.66 | 1.7 |
| Nickel | Not Tested | 0.16 | 0.2 |

As can be seen in Table I, the amount of oil and grease in the sludge was reduced to below fifty ppm. Moisture content was reduced to less than one percent by weight. The content of other organic materials was reduced to levels well below those identified as the standard for "best demonstrated available technology" (hereinafter "BDAT") by the Environmental Protection Agency (EPA). Also, the content of chromium and nickel, as measured by the "toxicity characteristic teaching procedure" (hereinafter "TCLP") specified by the EPA were also well below their corresponding BDAT standards.

EXAMPLE II

A soil sample was obtained from a manufactured-gas A soil sample plant (hereinafter "MGP") site which included coal tar residues. The soil sample was treated by the same system and by the same method described in Example I, except that the temperature of the eutectic salt in the screw conveyors was 470° C. Also, the temperature to which the soil was raised was about 420° C. and the temperature of the nitrogen directed into the screw processor was about 580° C.

The amounts of identified contaminants in parts per million (hereinafter "ppm"), both before and after treatment, are presented in Table II, shown below:

TABLE II

MGP Contaminated Soil

| Compound | Waste Feed (ppm) | Treated Sample (ppm) |
|---|---|---|
| PAH's (polyacromatic hydrocarbons) | | |
| Naphthalene | 110 | <3.7 |
| Acenaphthylene | 92 | <4.3 |
| Acenaphthene | 130 | <5.2 |
| Fluorene | 190 | <0.5 |
| Phenanthrene | 570 | <1.8 |
| Anthracene | 170 | <0.8 |
| Fluoranthrene | 530 | <0.1 |
| Pyrene | 890 | <5.8 |
| Benzo(b)anthracene | 370 | <0.2 |
| Chrysene | 590 | <4.2 |
| Benzo(b)fluoranthene | 150 | <0.1 |
| Benzo(k)fluoranthene | 93 | <0.1 |
| Benzo(a)pyrene | 420 | <0.1 |
| Dibenz(ab)anthracene | 83 | <0.4 |
| Benzo(ghi)perylene | 370 | <0.2 |
| Indeno(123-cd)pyrene | 90 | <13 |
| Other Organics Tested | | |
| Toluene | 0.5 | <0.5 |
| M-Xylene | 1.1 | <0.5 |
| O-Xylene | 8.8 | <0.5 |
| Cyanide | 11 | <0.5 |

Removal efficiencies, which were calculated as the percentage of component removed from the feed material, were in the range of between about 85% and about 99.9% for all of the above listed components. The removal efficiency of cyanide was about ninety-five percent.

EQUIVALENTS

Those skilled in the art will recognize, or be able ascertain using no more than routine experimentation, many equivalents to specific embodiments of the invention described specifically herein. Such equivalents are intended to be encompassed in the scope of the following claims.

We claim:

1. A system for removing at least a portion of a volatile component from a matrix, comprising:
   a) a housing having a housing inlet and a housing outlet;
   b) conveying means disposed within the housing for conveying the matrix from the housing inlet through the housing to the housing outlet, the conveying means defining a conduit for conducting a hot medium through the conduit to heat the conveying means to a temperature sufficient to volatilize at least a portion of the volatile component within the matrix;
   c) gas inlet means disposed within the housing and extending substantially parallel to a major axis of the conveying means, for discharging a hot gas from the gas inlet means and above the matrix along at least a substantial portion of the length of the housing; and
   d) gas outlet means disposed within the housing and extending substantially parallel to a major axis of the gas inlet means for receiving the hot gas and the volatilized component, whereby the hot gas discharged from the gas inlet means passes over the matrix and transports the volatilized component into the gas outlet means, thereby removing at least a portion of the volatile component from the matrix.

2. A system of claim 1 wherein the conveying means includes at least one screw conveyor.

3. A system of claim 2 wherein the gas inlet means includes a gas inlet tube and the gas outlet means includes a gas outlet tube.

4. A system of claim 3 wherein the gas outlet tube comprises a wye having two arms, each arm defining at least one aperture, and wherein the gas inlet tube is disposed between the arms of the wye, whereby hot gas discharged from the gas inlet tube into the housing chamber can pass across the matrix to the arms in a direction which is substantially perpendicular to the direction of conveyance of the matrix by the screw conveyor from the housing inlet to the housing outlet.

5. A system of claim 4 further including a eutectic heating system for heating the screw conveyor to a temperature sufficient to volatilize the volatile component of the matrix conveyed by the screw conveyors, including:

a) a eutectic salt solution disposed within a container;
b) means for heating a gas to a temperature sufficient to heat the screw conveyor to a temperature sufficient to prevent significant solidification of the eutectic salt solution;
c) means for directing the heated gas through the conduits of the screw conveyor to heat the screw conveyor to a temperature sufficient to prevent significant solidification of eutectic salt solution within the screw conveyor;
d) means for heating the eutectic salt solution within the container to a temperature sufficient to volatilize at least a portion of the volatile component within the matrix;
e) means for directing the heated eutectic salt solution from the container through the heated screw conveyor to thereby volatilize the volatile component; and
f) means for directing the heated gas through the screw conveyor to thereby discharge the eutectic salt solution from the screw conveyor to the container without significant solidification of the eutectic salt solution within the screw conveyor.

6. A system for removing at least a portion of a volatile component from a matrix, comprising:
a) a housing having a housing inlet disposed at a first end of the housing and a housing outlet disposed at a second end of the housing;
b) at least one screw conveyor disposed within the housing for conveying the matrix from the housing inlet through the housing to the housing outlet, the screw conveyor defining a screw conveyor conduit for conducting a hot medium through the screw conveyor conduit to heat the screw conveyor to a temperature sufficient to volatilize at least a portion of the volatile component within the matrix;
c) a first gas inlet tube disposed within the first end of the housing and substantially parallel to the screw conveyor, whereby a first hot gas can be discharged from the first gas inlet tube along at least a substantial portion of the length of the first end of the housing;
d) a first gas outlet tube disposed within the first end of the housing and substantially parallel to the first gas inlet tube for receiving the first hot gas and the volatilized component, whereby a substantial portion of the first hot gas passes over the matrix and transports at least a significant portion of the component volatilized at the first end into the first gas outlet tube, thereby removing at least a portion of the volatile component from the matrix;
e) a second gas inlet tube disposed within the second end of the housing and substantially parallel to the screw conveyor, whereby a second gas can be discharged form the second gas inlet tube along at least a substantial portion of the length of the second end of the housing; and
f) a second gas outlet tube disposed within the second end of the housing and substantially parallel to the second gas inlet tube for receiving the second hot gas and the volatilized component, whereby a substantial portion of the second hot gas passes over the matrix and transports at least a portion of the component volatilized at the second end into the second gas outlet tube, thereby removing at least a portion of the volatile component from the matrix.

7. A system of claim 6 wherein the hot medium includes a eutectic salt solution.

8. A method for removing at least a portion of a volatile component from a matrix, comprising the steps of:
a) conveying a volatile component-containing matrix through a housing from a housing inlet to a housing outlet by conveying means disposed in the housing;
b) directing a hot medium through a conduit defined by the conveying means to heat the conveying means to a temperature sufficient to cause the conveying means to volatilize at least a portion of the volatile component within the matrix;
c) discharging a hot gas above the matrix along at least a substantial portion of the length of the housing from gas inlet means which is disposed within the housing and is substantially parallel to a major axis of the conveying means, whereby the hot gas passes over the matrix and transports the volatilized component to gas outlet means which is disposed within the housing and is substantially parallel to a major axis of the gas inlet means; and
d) directing the hot gas and volatilized component into the gas outlet means, whereby the volatilized component is discharged from the housing, thereby removing the volatile component from the matrix.

9. A method of claim 8 wherein the hot medium includes a eutectic salt solution.

10. A method of claim 9 further including the step of directing a hot preheat gas through the conduit of the conveying means before directing the eutectic salt solution through said conduit, thereby heating the conveying means to a temperature sufficient to prevent significant solidification of the eutectic salt solution within the conduit.

11. A method of claim 10 further including the step of directing a hot gas through the conduit after heating the conveying means, thereby discharging the eutectic salt solution from the conduit without significant solidification of the eutectic salt solution in said conduit.

12. A method of claim 11, wherein the preheat gas is directed through a gas conduit submerged in a eutectic salt solution bath, thereby heating the gas to a temperature sufficient to prevent significant solidification of the eutectic salt solution.

13. A method for removing at least a portion of a volatile component from a matrix, comprising the steps of:
a) conveying a volatile component-containing matrix through a housing from a housing inlet at a first end of the housing to a housing outlet at a second end of the housing by rotating a screw conveyor disposed in the housing;
b) directing a hot medium through a screw conveyor conduit defined by the screw conveyor to heat the screw conveyor to a temperature sufficient to cause the screw conveyor to volatilize at least a portion of the volatile component within the matrix;
c) discharging a first hot gas above the matrix along at least a substantial portion of the length of the first end of the housing from a first gas inlet tube which is disposed within the first end of the housing and is substantially parallel to the screw conveyor whereby the first hot gas passes over the matrix and transports at least a substantial portion of the component volatilized at the first end to a first gas outlet tube which is disposed at the first end and is substantially parallel to the first gas inlet tube;

d) directing the first hot gas and transport volatilized component into the first gas outlet tube, whereby the volatilized component is discharged from the housing, thereby removing at least a portion of the volatile component from the matrix;

e) discharging a second hot gas above the matrix along at least a substantial portion of the length of the second end of the housing from a second gas inlet tube which is disposed within the second end of the housing and is substantially parallel to the screw conveyor, whereby the second hot gas passes over the matrix and transports at least a substantial portion of the component volatilized at the second end to a second gas outlet tube which is disposed at the second end and is substantially parallel to the second gas inlet tube; and f) directing the second hot gas and transported volatilized component into the second gas outlet tube, whereby the volatilized component is discharged from the housing, thereby removing at least a portion of the volatile component from the matrix.

14. A method of claim 13 further comprising the steps of:

1) volatilizing a substantial portion of a first volatile component of the matrix at the first end;

b) removing a substantial portion of the first volatile component from the first end through the first gas outlet tube;

c) volatilizing a substantial portion of a second volatile component of the matrix at the second end, the second volatile component being significantly less volatile than the first volatile component; and d) removing a substantial portion of the second volatile component from the second end through the second gas outlet tube.

15. A system for heating a screw conveyor to a temperature sufficient to volatilize at least a significant portion of a volatile component within a matrix being conveyed through a screw conveyor housing by the screw conveyor, comprising:

a) means for heating a preheat gas significant temperature sufficient to prevent significant solidification of a eutectic salt solution;

b) means for directing the preheat gas through a screw conveyor conduit defined by a screw conveyor to heat the screw conveyor to a temperature sufficient to prevent significant solidification of said eutectic salt solution within said screw conveyor conduit;

c) means for heating a eutectic salt solution to a temperature sufficient to volatilize the volatile component;

d) means for directing the heated eutectic salt solution through the screw conveyor conduit to heat the screw conveyor to a temperature sufficient to volatilize at least a portion of the volatile component; and e) means for directing a hot gas through the screw conveyor conduit to thereby discharge the eutectic salt solution from the screw conveyor conduit without significant solidification of the eutectic salt solution within the screw conveyor conduit.

16. A system of claim 15 wherein means for heating the gas to a temperature sufficient to prevent significant solidification of said eutectic salt solution include a eutectic salt solution bath and a gas coil extending within the eutectic salt solution bath, the gas coil providing a fluid communication between a preheat gas source and the screw conveyor conduit, whereby a preheat gas directed from the preheat gas source is heated in the gas coil by the eutectic salt solution to a temperature sufficient to heat the screw conveyor to a temperature sufficient to prevent significant solidification of the eutectic salt solution in the screw conveyor conduit.

17. A system of claim 16 wherein a means for heating the preheat gas further include heating means disposed at a conduit disposed between the gas coil and the screw conveyor conduit.

18. A method for heating a screw conveyor in an amount sufficient to volatilize at least a significant portion of a volatile component of a matrix being conveyed by the screw conveyor, comprising the steps of:

heating a preheat gas to a temperature sufficient to prevent significant solidification of a eutectic salt solution;

b) directing the preheat gas through a screw conveyor disposed in a housing to heat the screw conveyor to a temperature sufficient to prevent significant solidification of said eutectic salt solution in said screw conveyor conduit;

c) heating a eutectic salt solution to a temperature sufficient to volatilize the volatile component;

d) directing the heated eutectic salt solution through the screw conveyor conduit to heat the screw conveyor to a temperature sufficient to volatilize at least a portion of the volatile component; and e) directing a hot gas through the screw conveyor conduit to thereby discharge the eutectic salt solution from the screw conveyor conduit without significant solidification of the eutectic salt solution within the screw conveyor conduit.

19. A method of claim 18 further including the step of directing the preheat gas through a gas coil disposed within a eutectic salt solution bath, thereby heating the gas to a temperature sufficient to heat the screw conveyor to a temperature sufficient to prevent significant solidification of the eutectic salt solution within the screw conveyor conduit.

20. A system for removing at least a portion of water and another volatile component from a matrix, comprising:

a) a dryer, including, i) a dryer housing having a housing inlet and a housing outlet.

ii) at least one dryer screw conveyor disposed within the dryer housing for conveying a matrix from the housing inlet to the housing outlet, the dryer screw conveyor defining a screw conveyor conduit for conducting a hot medium through said dryer screw conveyor to heat the dryer screw conveyor to a temperature sufficient to volatilize at least a portion of the water in the matrix.

iii) a dryer gas inlet tube disposed within the dryer housing substantially parallel to the dryer screw conveyor, whereby a hot gas can be discharged along a substantial portion of the length of the dryer housing from the gas inlet tube above the matrix, and iv) a dryer gas outlet tube disposed within the housing substantially parallel to the gas inlet tube for receiving the hot gas and the water vapor, whereby the hot gas discharged from the dryer gas inlet tube passes over the matrix and transports the water vapor into the dryer gas outlet tube, thereby removing the water vapor from the matrix; and b) a thermal processor, including:
   i) a housing having a housing inlet and a housing outlet, whereby the housing inlet can receive said matrix into the housing from the dryer housing outlet.
   ii) at least one screw conveyor disposed within the housing for conveying the matrix from the housing inlet to the housing outlet, the screw conveyor defining a screw conveyor conduit for conducting a hot medium through said screw conveyor conduit to heat the screw conveyor to a temperature sufficient to volatilize at least a portion of a volatile component within the matrix,
   iii) a gas inlet tube disposed within the housing substantially parallel to the screw conveyor, whereby a hot gas can be discharged along a substantial portion of the length of the housing from the gas inlet tube above the matrix, and
   iv) a gas outlet tube disposed within the housing substantially parallel to gas inlet tube for receiving the hot gas and the volatilized component, whereby the hot gas discharged from the gas inlet tube passes over the matrix and transports the volatilized component into the gas outlet tube, thereby removing the volatilized component from the matrix.

21. The system of claim 20 further including a system for heating the screw conveyor in the thermal processor to a temperature sufficient to volatilize the volatile component of the matrix, including:
   a) means for heating a preheat gas to a temperature sufficient to prevent significant solidification of a eutectic salt solution;
   b) means for directing the heated gas through the screw conveyor to heat the screw conveyor to a temperature sufficient to prevent significant solidification of the eutectic salt solution in the screw conveyor conduit;
   c) means for heating a eutectic salt solution to a temperature sufficient to volatilize the volatile component in the matrix;
   d) means for directing the heated eutectic salt solution through the screw conveyor conduit to thereby causes the screw conveyor to heat the matrix to a temperature sufficient to volatilize at least a significant portion of the volatile component within the matrix; and
   e) means for directing a hot gas through the screw conveyor conduit to thereby discharge the eutectic salt solution from said screw conveyor conduit without significant solidification of the eutectic salt solution within the screw conveyor conduit.

22. A system of claim 21 further including a cooler, including:
   a) a cooler housing having a housing inlet and a housing outlet, whereby a matrix from which at least a significant portion of a volatile component of the matrix has been removed is received through the housing inlet into the cooler housing;
   b) at least one cooler screw conveyor disposed within the cooler housing for conveying the matrix from the housing inlet through the cooler housing to the housing outlet, the screw conveyor defining a screw conveyor conduit for conducting a cooling medium through the cooler housing to significantly cool the matrix in the cooler housing.

23. A method for removing at least a portion of water and another volatile component from a matrix, comprising the steps of:
   a) rotating a screw conveyor disposed in a dryer housing to convey a matrix from a housing inlet to a housing outlet of the dryer housing;
   b) directing a hot medium through a screw conveyor conduit defined by the screw conveyor, whereby the screw conveyor heats the matrix to a temperature sufficient to volatilize at least a portion of the water within the matrix;
   c) discharging a hot gas above the matrix along at least a substantial portion of the length of the dryer housing from a gas inlet tube which is disposed within the dryer housing and is substantially parallel to the screw conveyor, whereby the hot gas is passes over the matrix and transports the water vapor to a gas outlet tube which is disposed within the dryer housing and is substantially parallel to the gas inlet tube;
   d) directing the hot gas and water vapor into the gas outlet tube, whereby the water vapor is discharged from the dryer housing, thereby removing the water vapor from the matrix;
   e) directing the matrix from the dryer housing into a thermal processor housing through a housing inlet of the thermal processor housing;
   f) rotating a thermal processor screw conveyor disposed in the thermal processor housing to convey the matrix from the housing inlet to a housing outlet of the thermal processor housing;
   g) directing a hot medium through a conduit defined by the thermal processor screw conveyor, whereby said screw conveyor heats the matrix to a temperature sufficient to volatilize at least a significant portion of the volatile component within the matrix;
   h) discharging a hot gas above the matrix along at least a substantial portion of the length of the housing from a gas inlet tube which is disposed within the thermal processor housing and is substantially parallel to the thermal processor screw conveyor, whereby the hot gas passes over the matrix and transports the volatilized component to a gas outlet tube which is disposed within the thermal processor housing and is substantially parallel to the gas inlet tube;
   i) directing the hot gas and volatilized component into said gas outlet tube, whereby the volatilized component is discharged from the thermal processor housing, thereby removing the volatile component from the matrix; and
   j) discharging the dry matrix, from which at least a significant portion of the water and the other volatile component have been removed, through the housing outlet of the thermal processor housing.

24. In a method for removing at least a portion of a volatile component from a matrix by heating a screw conveyor disposed within a housing to a temperature sufficient to volatilize the volatile component and by conveying the matrix through the housing by rotation of the screw conveyor to thereby heat the matrix to a temperature sufficient to volatilize at least a significant portion of the volatile component:

The improvement comprising discharging a hot gas over the matrix along at least a substantial portion of the length of the housing from a gas inlet tube which is disposed within the housing and is substantially parallel to the screw conveyor, whereby the hot gas passes over the matrix and transports the volatilized component into a gas outlet tube which is disposed within the housing and is substantially parallel to the gas inlet tube, and whereby the volatilized component is discharged from the housing, thereby removing at least a portion of the volatile component from the matrix.

25. A system for removing at least a portion of a volatile component from a matrix, comprising:
  a) a housing having a housing inlet and a housing outlet;
  b) two screw conveyors disposed in parallel arrangement within the housing for conveying the matrix from the housing inlet through the housing to the housing outlet, the screw conveyors defining screw conveyor conduits for conducting a hot medium through the screw conveyor conduits to heat the screw conveyors to a temperature sufficient to volatilize at least a portion of the volatile component contained within the matrix;
  c) a gas inlet tube disposed within the housing substantially parallel to the screw conveyors, whereby a hot gas can be discharged from the gas inlet tube above the matrix along at least a substantial portion of the length of the housing; and
  d) a gas outlet tube disposed within the housing substantially parallel to the gas inlet tube for receiving the hot gas and the volatilized component, whereby the hot gas discharged from the gas inlet tube passes over the matrix and transports the volatilized component into the gas outlet tube, thereby removing at least a portion of the volatile component from the matrix.

26. A method for removing at least a portion of a volatile component from a matrix, comprising the steps of:
  a) conveying a volatile component-containing matrix through a housing from a housing inlet to a housing outlet by rotating a screw conveyor disposed in the housing;
  b) directing a hot eutectic salt solution through a screw conveyor conduit defined by the screw conveyor to heat the screw conveyor to a temperature sufficient to cause the screw conveyor to volatilize at least a portion of the volatile component contained within the matrix;
  c) discharging a hot gas above the matrix along at least a substantial portion of the length of the housing from a gas inlet tube which is disposed within the housing and is substantially parallel to the screw conveyor, whereby the hot gas passes over the matrix and transports the volatilized component to a gas outlet tube which is disposed within the housing and is substantially parallel to the gas inlet tube; and
  d) directing the hot gas and volatilized component into the gas outlet tube, whereby the volatilized component is discharged from the housing, thereby removing the volatile component from the matrix.

* * * * *